(12) United States Patent
Stork et al.

(10) Patent No.: US 10,753,813 B1
(45) Date of Patent: Aug. 25, 2020

(54) BELT TENSION MEASUREMENT DEVICE

(71) Applicant: Bestorq, Inc., Lincoln, NE (US)

(72) Inventors: Delyn Stork, Lincoln, NE (US); Austin Unseld, Pierce, NE (US)

(73) Assignee: BESTORQ, INC., Lincoln, NE (US)

( * ) Notice: Subject to any disclaimer, the term of this patent is extended or adjusted under 35 U.S.C. 154(b) by 48 days.

(21) Appl. No.: 16/138,008

(22) Filed: Sep. 21, 2018

Related U.S. Application Data

(60) Provisional application No. 62/716,100, filed on Aug. 8, 2018.

(51) Int. Cl.
| | |
|---|---|
| G01L 5/04 | (2006.01) |
| G01M 13/023 | (2019.01) |
| G01L 5/06 | (2006.01) |
| G01L 5/102 | (2020.01) |
| G01L 5/103 | (2020.01) |
| G01L 5/10 | (2020.01) |

(52) U.S. Cl.
CPC ............. G01L 5/047 (2013.01); G01L 5/06 (2013.01); G01M 13/023 (2013.01); *G01L 5/10* (2013.01); *G01L 5/102* (2013.01); *G01L 5/103* (2013.01)

(58) Field of Classification Search
CPC . G01L 5/047; G01L 5/06; G01L 5/103; G01L 5/10; G01L 5/102; G01M 13/023
USPC .................. 33/787, 700, 783, 790, 806, 809
See application file for complete search history.

(56) References Cited

U.S. PATENT DOCUMENTS

| | | | | |
|---|---|---|---|---|
| 1,759,219 A | * | 5/1930 | Bowlus ................. | G01B 5/30 33/787 |
| 4,092,781 A | * | 6/1978 | Blake .................... | G01B 3/46 33/501.4 |
| 4,472,883 A | * | 9/1984 | Ortega .................. | G01B 5/30 33/1 H |
| 4,850,116 A | * | 7/1989 | Beyer .................... | G01B 7/02 33/788 |
| 5,509,374 A | * | 4/1996 | Trout .................... | G01B 5/30 116/200 |
| 6,510,617 B1 | | 1/2003 | Gerdes et al. | |

(Continued)

OTHER PUBLICATIONS

Timken, Carlisle Industrial Power Transmission Belts Catalog 2016, http://www.carlislebelts.com/cms_files/original/Carlisle%20Belts%20Catalog%202016_10887_web.pdf, p. 348, Accessed Sep. 17, 2018.

(Continued)

*Primary Examiner* — Jonathan M Dunlap
(74) *Attorney, Agent, or Firm* — Suiter Swantz pc llo

(57) ABSTRACT

A belt tension measurement device includes a sleeve with an opening in at least one end, a shaft insertable into the opening where at least a portion of the shaft protrudes from the opening when in a zero position, and a first securing component configured to couple the sleeve to a surface of a power transmission belt and an additional securing component configured to couple the shaft to the surface of the power transmission belt. The shaft includes one or more sets of marks. A set of the one or more sets of marks includes at least one mark. The at least one mark corresponds to at least one shaft position where the power transmission belt is tensioned a pre-determined amount via an extension force generated by an elongation of the power transmission belt. The shaft is moveable between the zero position and the at least one shaft position.

24 Claims, 17 Drawing Sheets

(56) References Cited

U.S. PATENT DOCUMENTS

| | | | | |
|---|---|---|---|---|
| 7,823,466 | B2* | 11/2010 | Glass | G01L 5/103 |
| | | | | 73/826 |
| 2009/0056476 | A1* | 3/2009 | Glass | G01L 5/06 |
| | | | | 73/862.391 |
| 2015/0040415 | A1* | 2/2015 | Hoebel | G01B 3/46 |
| | | | | 33/701 |
| 2018/0319312 | A1* | 11/2018 | Cooper | G01L 5/10 |

OTHER PUBLICATIONS

Timken, Instruction Manual for Carlisle Tension Finder, Carlisle Tension Finder Instructions, http://www.driveengineer.com/files/downloads/10994_carlisle_Tension-Finder_Instructions_2017_062717_5952c60be20cd.pdf, 2 pages, Accessed Sep. 17, 2018.

Timken, Carlisle Industrial Power Transmission Belts Catalog 2016, Carlisle Big Shot, http://www.carlislebelts.com/cms_files/original/Carlisle%20Belts%20Catalog%202016_10887_web.pdf, p. 349, Accessed Sep. 17, 2018.

Goodyear, Goodyear Power Transmission Products Full Line Catalog 2010, TensionRite® Strips, https://www.goodyearrubberproducts.com/2010newpdfs/Goodyear%20PTP%20Full%20Line%20Catalog%202010.pdf, p. 8, Accessed Sep. 17, 2018.

* cited by examiner

BELT TENSION MEASUREMENT DEVICE

CROSS-REFERENCE TO RELATED APPLICATIONS

The present application claims the benefit under 35 U.S.C. § 119(e) of U.S. Provisional Patent Application Ser. No. 62/716,100, filed Aug. 8, 2018, titled BELT TENSION MEASUREMENT DEVICE, naming Delyn Stork and Austin Unseld as inventors, which is incorporated herein by reference in the entirety.

TECHNICAL FIELD

The present invention generally relates to a power transmission system, and in particular to a belt tension measurement device.

BACKGROUND

One type of power transmission system includes a set of pulleys coupled together and rotated by a power transmission belt such as a V-belt. The V-belt transfers power between pulleys via friction, where the friction is multiplied by the mechanical advantage of the wedging principle. Correct V-belt operation is dependent on proper tension of the V-belt, though there is a wide range of tension in which a V-belt may correctly operate. For example, an under-tensioned V-belt may slip within a pulley groove, which may generate excess heat and result in premature wear of the V-belt, pulleys, or bearings within the pulleys. By way of another example, an over-tensioned V-belt may result in excess stress on the V-belt, pulleys, bearings within the pulleys, and/or shafts connected to the pulleys.

A variety of factors may need to be considered when tensioning a V-belt. For example, the V-belt may include a variety or sub-variety of V-belt, where each variety and/or sub-variety of V-belt is fabricated from different exterior materials and/or different interior tension cables. For instance, the variety or sub-variety of V-belt may include, but are not limited to, a classical V-belt, a wedge V-belt, a Kevlar V-belt, or the like. By way of another example, the V-belt may be utilized with a pulley of a particular diameter. By way of another example, the V-belt may be utilized in an application requiring a particular rotation per minute (RPM) operating speed. By way of another example, the V-belt may include a new V-belt or a used V-belt. By way of another example, the V-belt may include an unmolded construction, a cogged construction, a ribbed construction, or the like.

As such, tension in a V-belt is difficult to measure. For example, measuring "by feel" may result in a tensioning that is typically only between 7% and 50% of proper tensioning. By way of another example, measuring via devices currently known in the art may result in severe over-tensioning in the range of 150% to 250%. By way of another example, measuring via a Force-Deflection method requires a time-intensive method involving looking up numbers in a table or using a computer calculation, increasing downtime and resulting in lost revenue.

The Force-Deflection method includes measuring a span length P (e.g., the distance between the centers of two pulleys) and applying a force F (e.g., using a belt tension gauge) perpendicular to the belt span P at a center point C. In Imperial or SAE units, the force F is selected to generate an amount of belt deflection q determined from deflecting the belt $1/64$ inch for every 1 inch of belt span P (e.g., $q=1/64*P$). For example, where P is 32 inches, q is $32/64$ inches, or $1/2$ inch. One source of values for the force F is a table equating force values to one or more of small pulley diameter range, RPM range, cog states, and/or previous amount of belt use. It is noted herein, however, that force tables generally include the force F on a per-rib basis, such that the force F is multiplied per the number of ribs on the V-belt. For example, where the V-belt has five ribs, the force F provided in the table is multiplied by five.

Incorrect installation procedures may lead to shortened V-belt life. For example, a V-belt that has been "rolled on" may be under-tensioned, resulting in decreased V-belt life due to belt slip and heat build-up. By way of another example, cables within a V-belt that has been "stretched on" may be damaged by a prying motion during installation, which may lead to early V-belt failure. By way of another example, a worn V-belt may be over-tensioned if installed at the same tension as a new V-belt.

Between 50% and 70% of tension in a V-belt may be lost over time. For example, V-belt tension may decrease within the first hour of use as the belt settles in a pulley groove. In this regard, a V-belt may need be initially be over-tensioned during installation to compensate for the loss of tension during the break-in period of the V-belt, otherwise the V-belt may ultimately be under-tensioned which may lead to a shortened V-belt life. By way of another example, tension in the V-belt may decrease as the V-belt stretches during the course of its life.

Therefore, it would be advantageous to provide a system and method that overcomes the shortcomings described above.

SUMMARY

A belt tension measurement device is disclosed, in accordance with one or more embodiments of the present disclosure. In one embodiment, the belt tension measurement device includes a sleeve with an opening in at least one end. In another embodiment, the belt tension measurement device includes a shaft insertable into the opening. In another embodiment, at least a portion of the shaft protrudes from the opening when in a zero position. In another embodiment, the belt tension measurement device includes a first securing component configured to couple the sleeve to a surface of a power transmission belt and an additional securing component configured to couple the shaft to the surface of the power transmission belt. In another embodiment, the shaft includes one or more sets of marks. In another embodiment, a set of the one or more sets of marks includes at least one mark. In another embodiment, the at least one mark corresponds to at least one shaft position where the power transmission belt is tensioned a predetermined amount via an extension force generated by an elongation of the power transmission belt. In another embodiment, the shaft is moveable between the zero position and the at least one shaft position.

A belt tension measurement device is disclosed, in accordance with one or more embodiments of the present disclosure. In one embodiment, the belt tension measurement device includes a sleeve with an opening in at least one end. In another embodiment, the belt tension measurement device includes a shaft insertable into the opening. In another embodiment, at least a portion of the shaft protrudes from the opening when in a zero position. In another embodiment, the belt tension measurement device includes a first securing component configured to couple the sleeve to a surface of a power transmission belt and an additional securing component configured to couple the shaft to the surface of the power transmission belt. In another embodiment, the belt tension measurement device includes one or more signal generators configured to output one or more signals corresponding to at least one shaft position where the power transmission belt is tensioned a pre-determined amount via an extension force generated by an elongation of the power transmission belt. In another embodiment, the shaft is moveable between the zero position and the at least one shaft position. In another embodiment, the belt tension measurement device includes one or more electronic indicators configured to at least one of activate or deactivate based on the one or more signals outputted by the one or more signal generators.

A belt tension measurement device is disclosed, in accordance with one or more embodiments of the present disclosure. In one embodiment, the belt tension measurement device includes a sleeve including an opening in at least one end. In another embodiment, the belt tension measurement device includes a shaft insertable into the opening. In another embodiment, at least a portion of the shaft protrudes from the opening when in a zero position. In another embodiment, the belt tension measurement device includes a first securing component configured to couple the sleeve to a surface of a power transmission belt and an additional securing component configured to couple the shaft to the surface of the power transmission belt. In another embodiment, the belt tension measurement device includes one or more signal generators configured to output one or more signals corresponding to at least one shaft position where the power transmission belt is tensioned a pre-determined amount via an extension force generated by an elongation of the power transmission belt. In another embodiment, the shaft is moveable between the zero position and the at least one shaft position. In another embodiment, the belt tension measurement device includes one or more input/output devices configured to transmit the one or more outputted signals.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

FIGS. 1A-7 generally illustrate a belt tension measurement device, in accordance with one or more embodiments of the present disclosure.

Embodiments of the present disclosure are directed to a belt tension measurement device. Embodiments of the present disclosure are also directed to one or more sets of markings on the belt tension measurement device, where the one or more sets of markings correspond to a particular V-belt, where the one or more markings are configured to indicate when the particular V-belt is correctly tensioned.

Figure 1A:
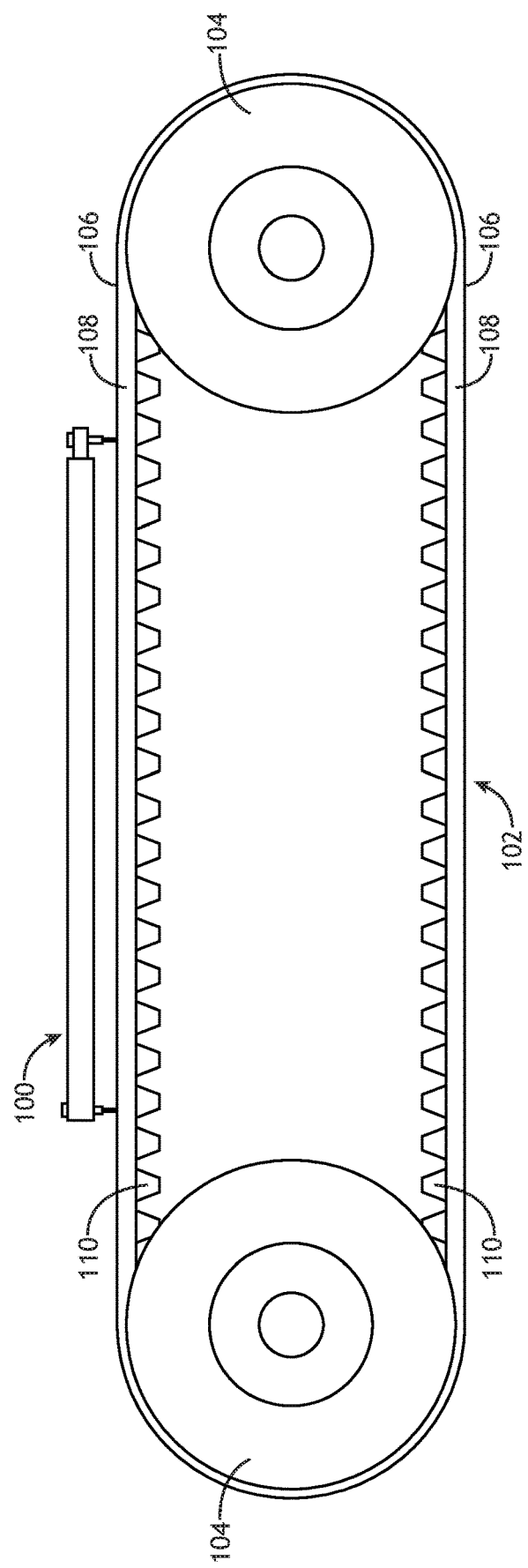
FIG. 1A illustrates a system including a belt tension measurement device, in accordance with one or more embodiments of the present disclosure.
Figure 1B:
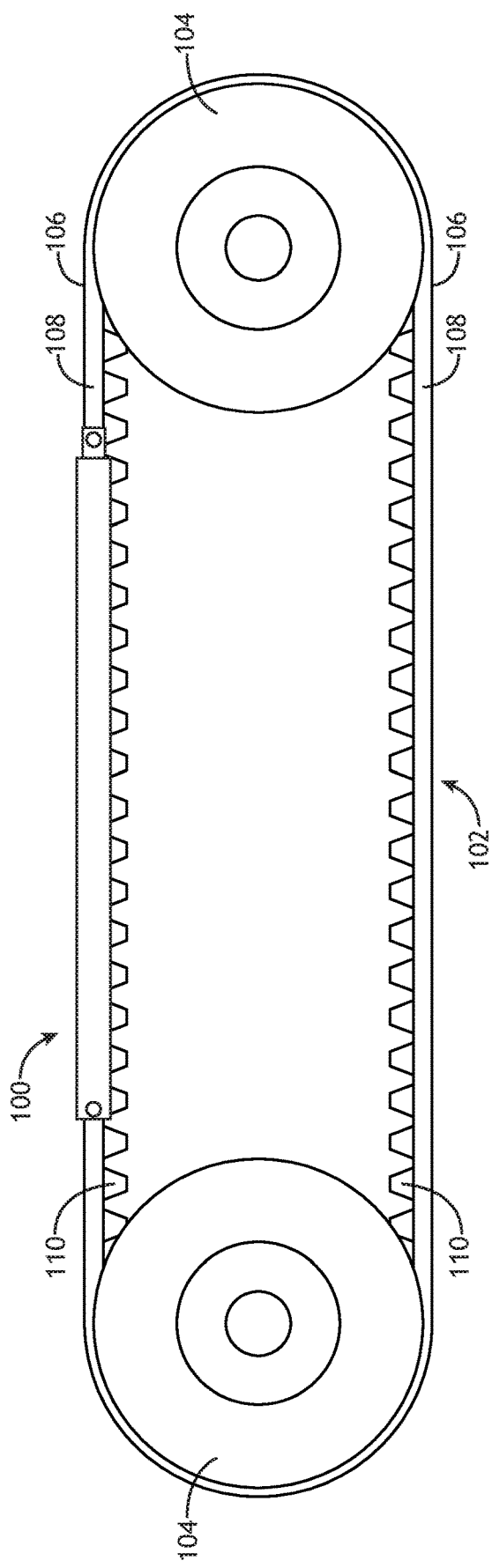
FIG. 1B illustrates a system including a belt tension measurement device, in accordance with one or more embodiments of the present disclosure.
Figure 1C:
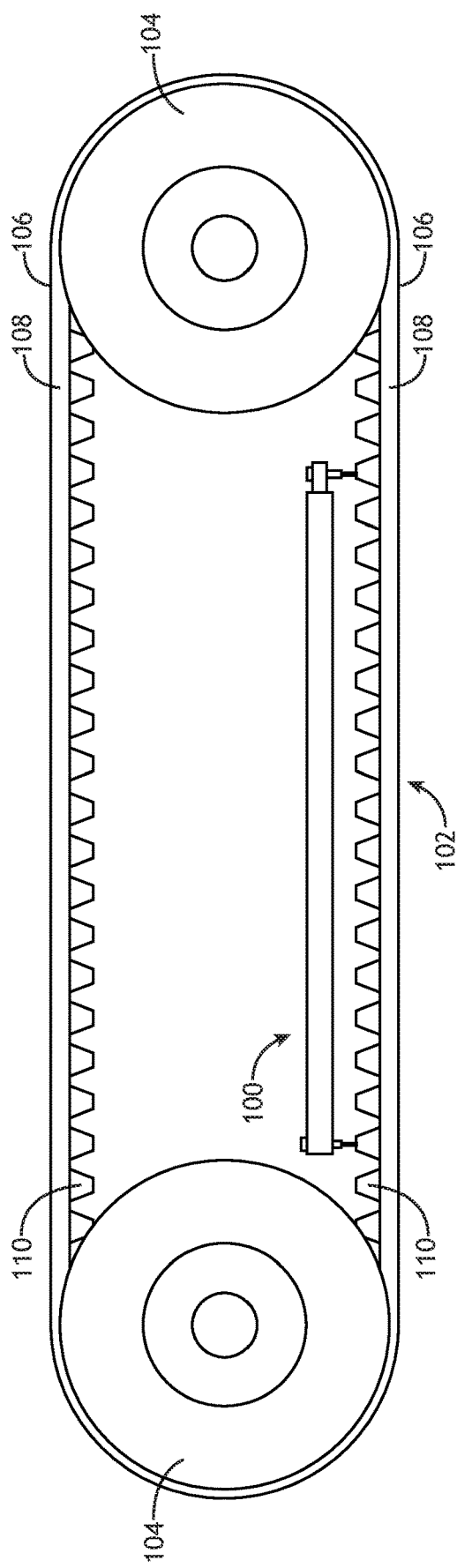
FIG. 1C illustrates a system including a belt tension measurement device, in accordance with one or more embodiments of the present disclosure.

FIG. 1A-1C illustrate a system including a belt tension measurement device 100, in accordance with one or more embodiments of the present disclosure.

In one embodiment, the system includes one or more power transmission belts. For example, the one or more power transmission belts may include a V-belt 102. For instance, the V-belt 102 may include, but is not limited to, a classical V-belt, a wedge V-belt, a Kevlar heavy-duty V-belt (e.g., a V-belt fabricated from aramid tensile cord), or the like. In addition, the V-belt 102 may include, but is not limited to, a single V-belt, a banded V-belt (e.g., multiple V-belts tied together with a fabric tie band), or the like. Further, the V-belt 102 may include, but is not limited to, a single-sided V-belt, a double-sided V-belt, or the like. Further, the V-belt 102 may include a polyester cord instead of the aramid tensile cord.

In another embodiment, the system includes one or more sets of two or more pulleys 104. For example, the V-belt 102 may include a base that is insertable within a set of grooves of a set of two or more pulleys 104. For instance, the base of the V-belt 102 (e.g., V-belt 102 base) may include an unmolded construction, a cogged construction, a ribbed construction, or the like.

In another embodiment, the belt tension measurement device 100 is couplable to a surface of the V-belt 102. For example, as illustrated in FIG. 1A, the belt tension measurement device 100 may be coupled to an outer surface 106 of the V-belt 102. For instance, the outer surface 106 may include a top surface or a bottom surface of the V-belt 102 in a horizontal-oriented two-pulley system. By way of another example, as illustrated in FIG. 1B, the belt tension measurement device 100 may be coupled to a side surface or sidewall 108 of the V-belt 102. By way of another example, as illustrated in FIG. 1C, the belt tension measurement device 100 may be coupled to a surface (e.g., inner surface) of the base 110 of the V-belt 102. In this regard, the belt tension measurement device 100 may be utilized with a power transmission line in a multitude of ways and/or at a multitude of locations as opposed to devices currently known in the art.

Although embodiments of the present disclosure are directed to the system including the V-belt 102, it is noted herein the system may include any type of power transmission belt known in the art requiring an initial tensioning prior to usage. For example, the system may include a flat belt, a round belt, a poly V-belt, a timing belt, or any other common-use or specialty power transmission belt known in the art requiring an initial tensioning prior to usage and/or re-tensioning after a pre-determined number of operating hours. For instance, the timing belt may include, but is not limited to, a high torque drive (HTD) timing belt, a trapezoidal timing belt, a dual-sided timing belt, or the like. In addition, the specialty power belts may include, but are not limited to, cotton cleaner belts, mill belts, automotive V-belts, lawn and garden V-belts, fractional horsepower (FHP) V-belts, or the like. In addition, it is noted herein that any embodiment directed to utilizing the belt tension measurement device 100 may be directed to utilizing the belt tension measurement device 100 with any type of power transmission belt known in the art. Therefore, the above description should not be interpreted as a limitation on the present disclosure but merely an illustration.

Figure 2A:
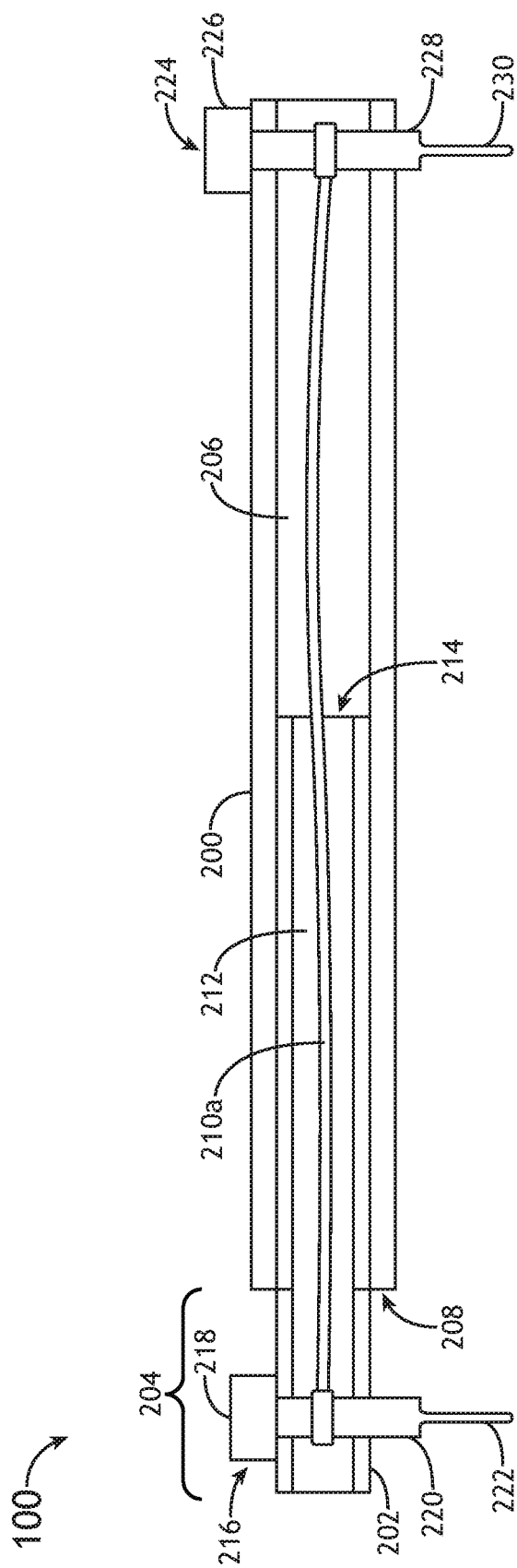
FIG. 2A illustrates a schematic cross-section view of a belt tension measurement device, in accordance with one or more embodiments of the present disclosure.
Figure 2B:
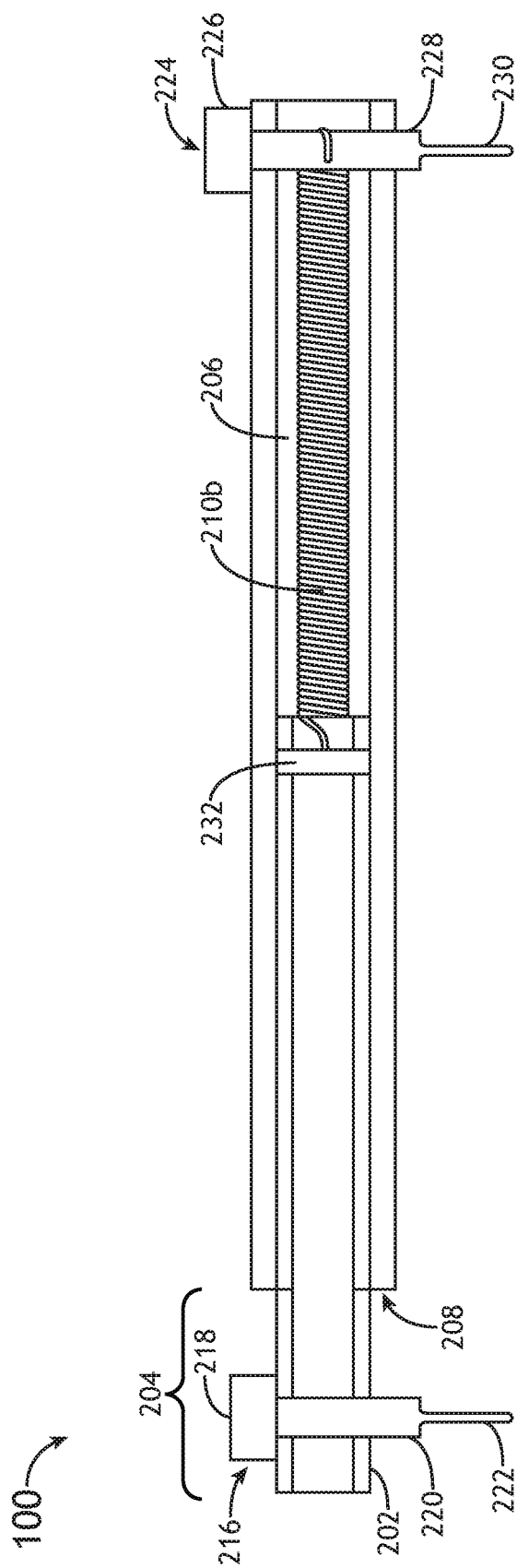
FIG. 2B illustrates a schematic cross-section view of a belt tension measurement device, in accordance with one or more embodiments of the present disclosure.
Figure 2C:
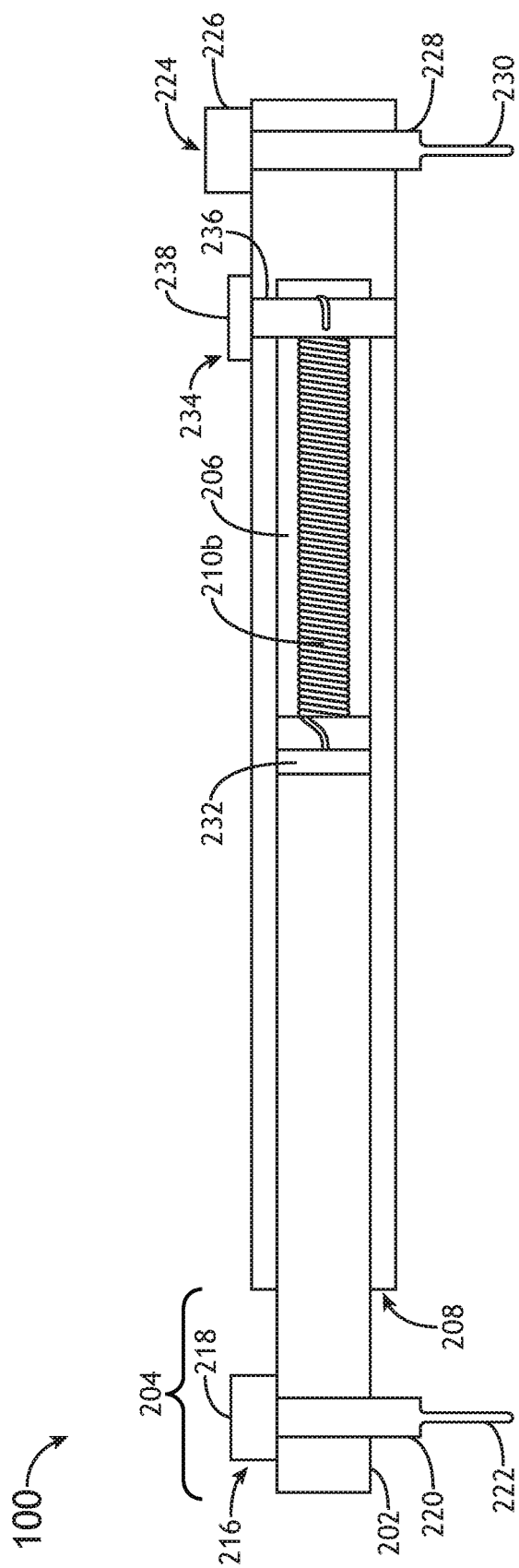
FIG. 2C illustrates a schematic cross-section view of a belt tension measurement device, in accordance with one or more embodiments of the present disclosure.

FIG. 2A-2C illustrate schematic cross-section views of a belt tension measurement device 100, in accordance with one or more embodiments of the present disclosure.

In one embodiment, the belt tension measurement device 100 includes a sleeve 200. In another embodiment, a moveable shaft 202 is inserted into a hollow portion 206 of the sleeve 200 through an opening 208 in one end of the sleeve 200. For example, a portion 204 of the moveable shaft 202 may protrude from the opening 208 when the moveable shaft 202 is at a zero position. By way of another example, the moveable shaft 202 may extend from and/or retract into the opening 208 when a force is applied to the moveable shaft 202. For instance, the moveable shaft 202 may extend from and/or retract into the opening 208 while the sleeve 200 remains in a fixed position (e.g., there is motion in one direction). In addition, the moveable shaft 202 may extend from and/or retract into the opening 208 while the sleeve 200 is pulled away from the zero position (e.g., there is motion in two directions).

It is noted herein an end opposite the end including the opening 208 may be open or be closed. For example, the opening 208 may be plugged, capped, covered, not manufactured with an opening, or the like.

It is noted herein that one or more of the sleeve 200 and/or the moveable shaft 202 may include an end with a cross-section of any two-dimension shape known in the art. For example, one or more of the sleeve 200 and/or the moveable shaft 202 may include an end with a cross-section including any number of sides, ranging up to an N number of sides (e.g., the cross-section may be up to an N-sided polygon). For instance, one or more of the sleeve 200 and/or the moveable shaft 202 may include an end with a cross-section including, but not limited to, three sides (e.g., a triangle) or four sides (e.g., a quadrilateral such as a rectangle or a square). By way of another example, the cross-section of the end of the sleeve 200 and the end of the moveable shaft 202 may be substantially similar. For instance, the cross-section of the end of the sleeve 200 may be a rectangle, while the cross-section of the end of the moveable shaft 202 may be a square with an outer diameter equal to or less than an inner surface dimension of the sleeve 200. By way of another example, the cross-section of the end of the sleeve 200 and the cross-section of the end of the moveable shaft 202 may be different. For instance, the cross-section of the end of the sleeve 200 may be a square, while the cross-section of the end of the moveable shaft 202 may be a circle with an outer diameter equal to or less than an inner surface dimension of the sleeve 200).

In another embodiment, the moveable shaft 202 may be acted upon by a force configured to extend the moveable shaft 202 from the zero position (e.g., an extension force). For example, the extension force may be provided by tension generated via elongation of the V-belt 102. By way of another example, the extension force may extend the moveable shaft 202 from the zero position to one or more positions including, but not limited to, a position related to the V-belt 102 located within a new pulley groove (e.g., a new pulley position) and/or a position related to the V-belt 102 located within a worn pulley groove (e.g., a worn pulley position). For instance, the new pulley position and/or the worn pulley position may indicate when the V-belt 102 is correctly tensioned.

In another embodiment, the moveable shaft 202 is coupled to an elastic component configured to provide a return force to the moveable shaft 202, which retracts the moveable shaft 202 to the zero position when the extension force is removed. For example, as illustrated in FIG. 2A, the elastic component configured to provide the return force may include, but is not limited to, an elastic cord 210*a*. By way of another example, as illustrated in FIGS. 2B and 2C, the elastic component configured to provide the return force may include, but is not limited to, a spring 210*b*.

It is noted herein the return force provided by the elastic component may be weaker than the extension force (e.g., tension generated via elongation of the V-belt 102). For example, the return force may be negligible compared to the extension force, such that the return force does not adversely affect the tensioning of the V-belt via elongation caused by the extension force. In addition, it is noted herein the extension force (e.g., tension generated via elongation of the V-belt 102) may or may not plastically deform the elastic component.

In another embodiment, the elastic component is inserted into a hollow portion 212 of the moveable shaft 202 and/or is inserted into the hollow portion 206 of the sleeve 200. Where the elastic component is inserted into both the hollow portion 212 and the hollow portion 206, the elastic component may pass through an opening 214 in one end of the moveable shaft 202.

It is noted herein an end opposite the end including the opening 214 may be open or be closed. For example, the opening 214 may be plugged, capped, covered, not manufactured with an opening, or the like.

In another embodiment, as illustrated in FIGS. 2A and 2B, the sleeve 200 is hollow. It is noted herein, however, that some or all of the sleeve 200 may be solid, as illustrated in FIG. 2C. For example, some or all of the sleeve 200 may be solid (e.g., not hollow) if the moveable shaft 202 and/or the elastic component is not inserted into the hollow portion 206. Therefore, the above description should not be interpreted as a limitation on the present disclosure but merely an illustration.

In another embodiment, as illustrated in FIGS. 2A and 2B, the moveable shaft 202 is hollow. It is noted herein, however, that some or all of the moveable shaft 202 may be solid, as illustrated in FIG. 2C. For example, some or all of the moveable shaft 202 may be solid (e.g., not hollow) if the elastic component is not inserted into the hollow portion 212. Therefore, the above description should not be interpreted as a limitation on the present disclosure but merely an illustration.

In another embodiment, the belt tension measurement device 100 includes one or more securing components configured to couple the sleeve 200 and/or the moveable shaft 202 to the V-belt 102.

In another embodiment, the one or more securing components includes a moveable shaft coupler. In another embodiment, the moveable shaft coupler includes a shaft pin 216. For example, the shaft pin 216 may pass through one or more of a top surface and/or a bottom surface of the moveable shaft 202. By way of another example, the shaft pin 216 may pass through the portion 204 of the moveable shaft 202 protruding from the opening 208. In another embodiment, the shaft pin 216 includes one or more of a head 218, a body 220, and/or a pin 222. For example, the head 218, the body 220, and/or the pin 222 may prevent the moveable shaft 202 from retracting into the opening 208. For instance, the head 218, the body 220, and/or the pin 222 may provide interference via contact with an edge, end, and/or side of the sleeve 200.

In another embodiment, the zero position is defined as a position where the shaft pin 216 (e.g., the pin 222 of the shaft pin 216) couples to the surface of the V-belt 102 while the shaft pin 216 (e.g., the head 218 of the shaft pin 216) comes into contact with the edge, end, and/or side of the sleeve 200. As such, the gap between the shaft pin 216 (e.g., the head 218 of the shaft pin 216) and the belt tension measurement device 100 as illustrated throughout the Figures is provided merely for ease of viewing, and should not be interpreted as a limitation on the present disclosure but merely an illustration.

In another embodiment, the one or more securing components includes a sleeve coupler. In another embodiment, the sleeve coupler includes a sleeve pin 224. For example, the sleeve pin 224 may pass through one or more of a top surface and/or a bottom surface of the sleeve 200. By way of another example, the sleeve pin 224 may pass through the sleeve 200 at a position that does not interfere with the moveable shaft 202. For instance, the sleeve pin 224 may not come into contact with and/or inhibit movement of the moveable shaft 202. In another embodiment, the sleeve pin 224 includes one or more of a head 226, a body 228, and/or a pin 230.

In another embodiment, the shaft pin 216 and the sleeve pin 224 are configured to engage a surface of the V-belt 102. For example, the surface may include the outer surface 106, the side surface or sidewall 108, and/or the surface (e.g., inner surface) of the base 110). By way of another example, the shaft pin 216 and/or the sleeve pin 224 may couple the belt tension measurement device 100 proximate to the surface of the V-belt 102 via the pins 222, 230. It is noted herein that engaging a surface of the V-belt 102 may prevent movement of the moveable shaft 202 other than the extension from the zero position during the generation of tension via elongation of the V-belt 102.

In another embodiment, the elastic component configured to provide the return force is coupled to one or more components of the belt tension measurement device 100. For example, as illustrated in FIG. 2A, the elastic cord 210a may be coupled to the shaft pin 216 (e.g., to the body 220 of the shaft pin 216), and may be coupled to the sleeve pin 224 (e.g., to the body 228 of the sleeve pin 224). By way of another example, as illustrated in FIG. 2B, the spring 210b may be coupled proximate to an end of the moveable shaft 202 (e.g., the end with the opening 214) via a band 232, and may be coupled to the sleeve pin 224 (e.g., to the body 228 of the sleeve pin 224).

By way of another example, as illustrated in FIG. 2C, the spring 210b may be coupled proximate to an end of the moveable shaft 202 (e.g., the end with the opening 214) via a band 232, and may be coupled to a fastener 234 (e.g., a rivet). For example, the spring 210b may be coupled to a body 236 of the fastener 234). It is noted herein that the fastener 234 may pass through the sleeve 200 at a position that does not interfere with the moveable shaft 202. For example, the fastener 234 may not come into contact with and/or inhibit movement of the moveable shaft 202. In addition, it is noted herein the fastener 234 may include a head 238. Further, it is noted herein the elastic cord 210a may be coupled to at least one of the band 232 and/or the fastener 234 instead of the shaft pin 216 (e.g., the body 218 of the shaft pin 216) and/or the sleeve pin 224 (e.g., the body 228 of the sleeve pin 224).

It is noted herein the moveable shaft coupler and/or the moveable sleeve coupler may be any device capable of securing the moveable shaft to the V-belt 102. For example, the moveable shaft coupler and/or the moveable sleeve coupler may include, but is not limited to, a clamp, an adhesive, or the like. For instance, the clamp may include, but is not limited to, a spring-loaded clamp or a manually-tightened clamp. Therefore, the above description should not be interpreted as a limitation on the present disclosure but merely an illustration.

Figure 3A:
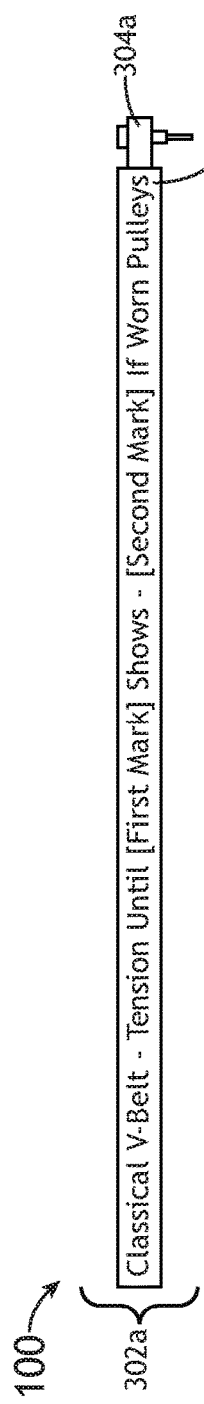
FIG. 3A illustrates a label for a belt tension measurement device, in accordance with one or more embodiments of the present disclosure.
Figure 3B:
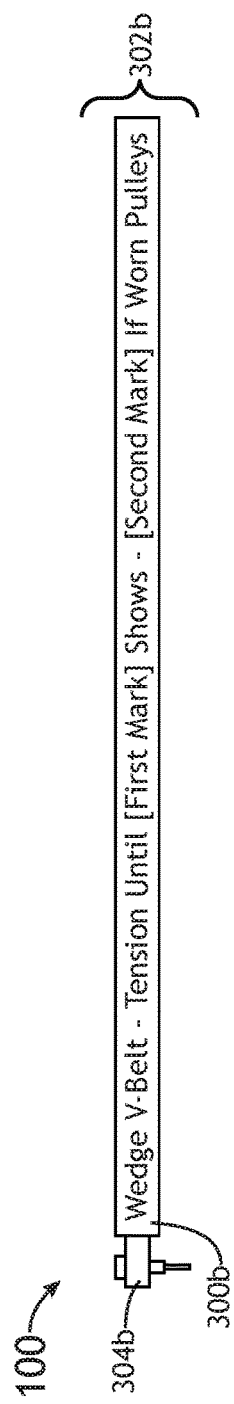
FIG. 3B illustrates a label for a belt tension measurement device, in accordance with one or more embodiments of the present disclosure.
Figure 3C:
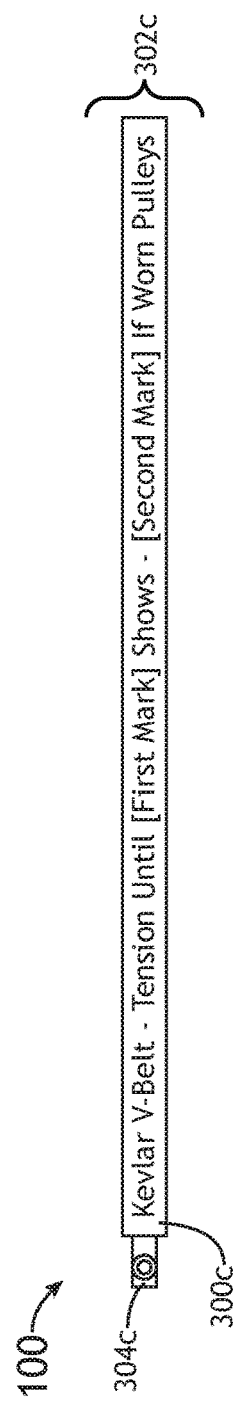
FIG. 3C illustrates a label for a belt tension measurement device, in accordance with one or more embodiments of the present disclosure.

FIGS. 3A-3C illustrate labels for the belt tension measurement device 100, in accordance with one or more embodiments of the present disclosure. FIGS. 4A-6C generally illustrate a belt tension measurement device 100 coupled to the outer surface 106 of the V-belt 102, in accordance with one or more embodiments of the present disclosure.

In one embodiment, as illustrated in FIG. 3A, a surface 300a (e.g., a first side surface or sidewall) of the belt tension measurement device 100 includes a label 302a corresponding to information about a classical V-belt (e.g., V-belt 102). For example, the label 302a may include information regarding the types of classical V-belts including, but are not limited to, classical belt type A, AX, B, BX, CX, D, or the like. For instance, an "X" designation may represent a cogged classical V-belt and no "X" designation may represent an unmolded classical V-belt. By way of another example, the label 302a may include information regarding what is indicated by a classical set of marks on a surface 304a of the moveable shaft 202.

Figure 4A:
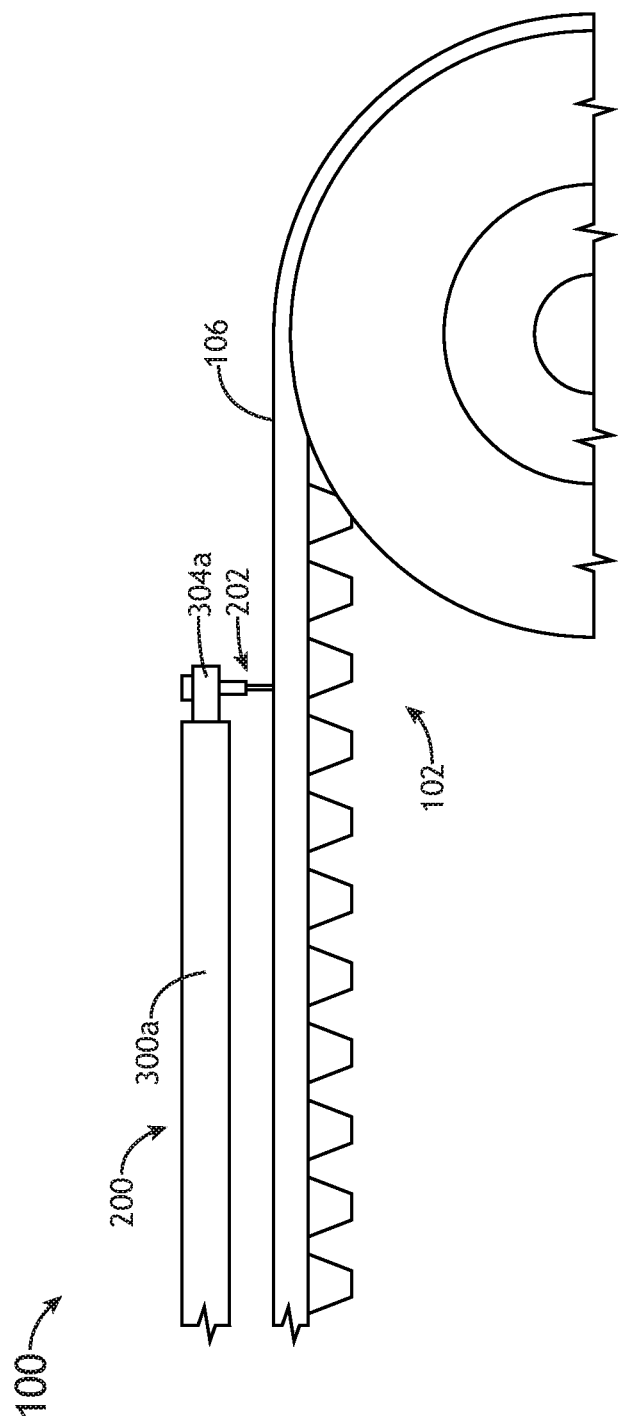
FIG. 4A illustrates a partial view of a system including a belt tension measurement device, in accordance with one or more embodiments of the present disclosure.

Referring now to FIG. 4A, the label 302a may not define a mark when the moveable shaft 202 is in the zero position.

Figure 4B:
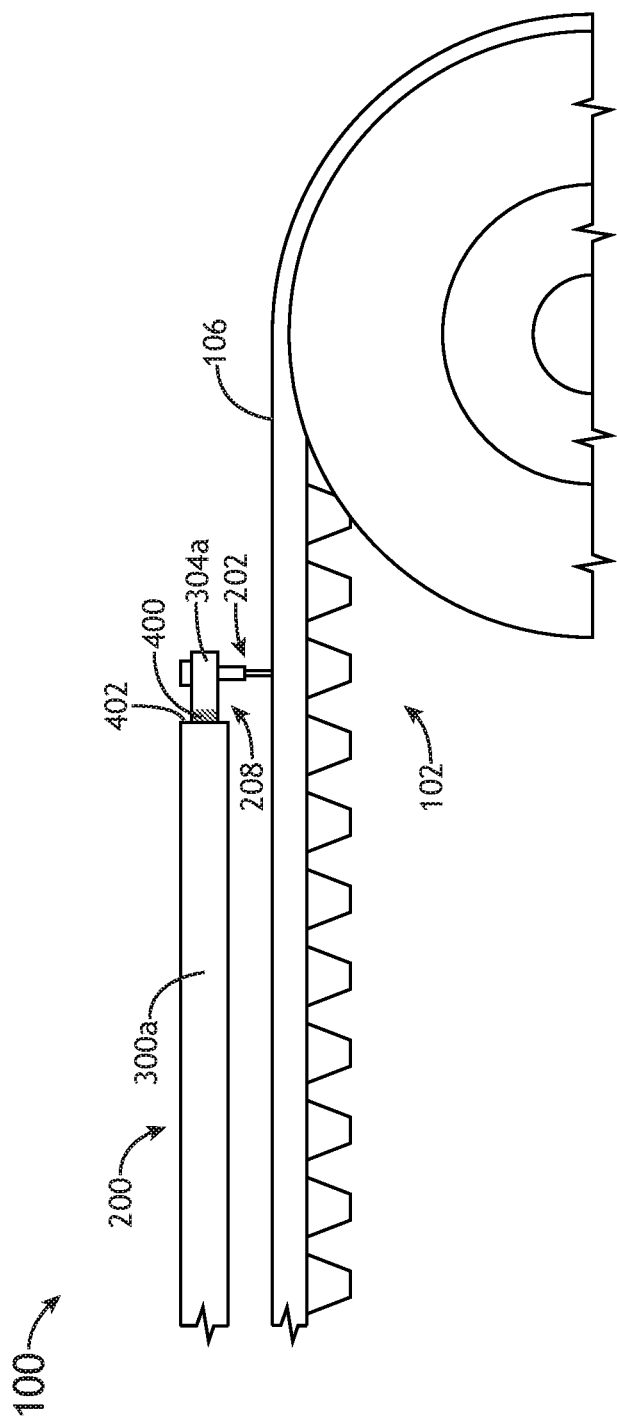
FIG. 4B illustrates a partial view of a system including a belt tension measurement device, in accordance with one or more embodiments of the present disclosure.

Referring now to FIG. 4B, the label 302a may define a first mark 400 (e.g., a line of a first color including, but not limited to, green) for a position of the moveable shaft 202 related to a proper tensioning of a classical V-belt (e.g., V-belt 102) in a new pulley groove (e.g., a new pulley position), where the new pulley position of the moveable shaft 202 is a first select distance from the zero position of the moveable shaft 202. It is noted herein an edge 402 of the end with the opening 208 for the moveable shaft 202 may be aligned with the first mark 400 when the moveable shaft 202 is in the new pulley position.

Figure 4C:
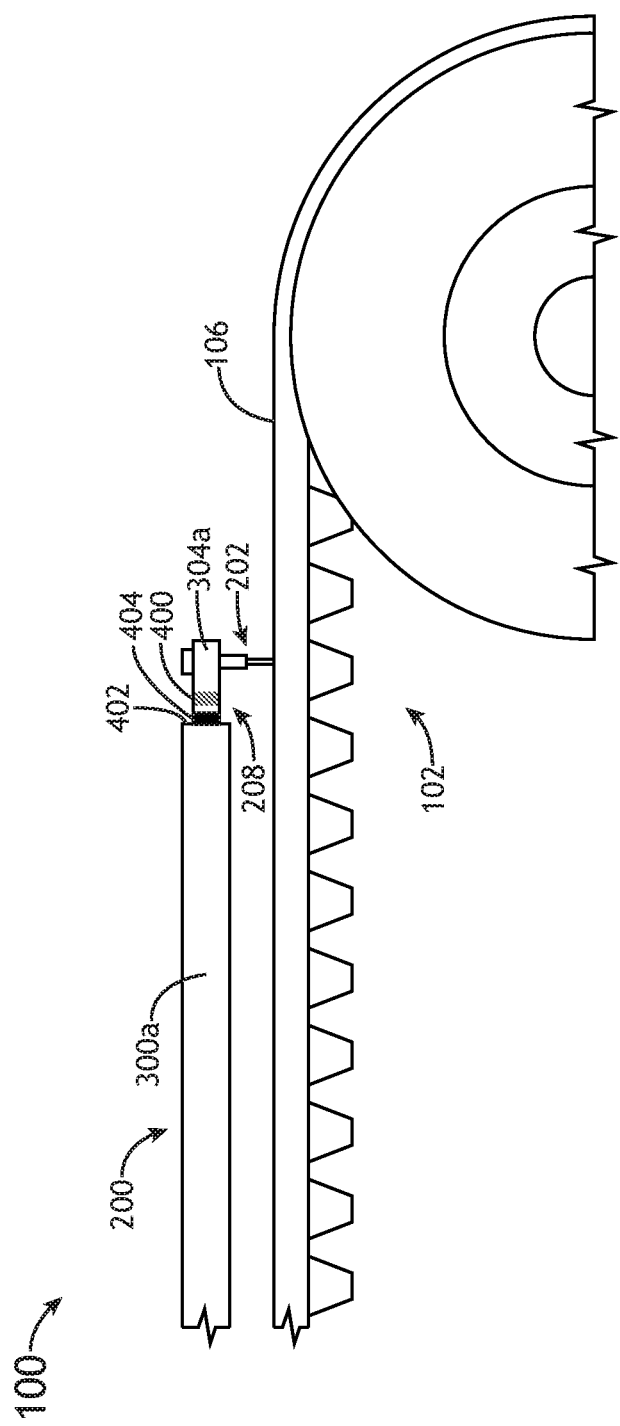
FIG. 4C illustrates a partial view of a system including a belt tension measurement device, in accordance with one or more embodiments of the present disclosure.

Referring now to FIG. 4C, the label 302a may define an additional mark 404 (e.g., a line of an additional color including, but not limited to, blue) for a position of the moveable shaft 202 related to a proper tensioning of the classical V-belt (e.g., V-belt 102) in a worn pulley groove (e.g., a worn pulley position), where the worn pulley position of the moveable shaft 202 is an additional select distance from the zero position of the moveable shaft 202. It is noted herein the edge 402 of the end with the opening 208 for the moveable shaft 202 may be aligned with the additional mark 404 when the moveable shaft 202 is in the worn pulley position.

It is noted herein the position of the first mark 400 and/or the additional mark 404 on the surface 304a of the moveable shaft 202 may be based on a percentage of stretching of the total V-belt length. For example, the classical V-belt (e.g., V-belt 102) in the new pulley groove may be at 0.6% of stretching of the total V-belt length. By way of another example, the classical V-belt (e.g., V-belt 102) in the worn pulley groove may include an additional 20% of the original 0.6% stretching, such that the classical V-belt (e.g., V-belt 102) in the worn pulley groove may be at 0.72% of stretching of the total V-belt length.

In another embodiment, as illustrated in FIG. 3B, a surface 300b (e.g., an additional side surface or sidewall) the belt tension measurement device 100 includes a label 302b corresponding to information about a wedge V-belt (e.g., V-belt 102). For example, the label 302b may include information regarding the types of wedge V-belts including, but not limited to, wedge belt type 3V, 3VX, 5V, 5VX, 8V, 8VX, or the like. For instance, an "X" designation may represent a cogged wedge V-belt and no "X" designation may represent an unmolded wedge V-belt). By way of another example, the label 302b may include information regarding what is indicated by a wedge set of marks on a surface 304b of the moveable shaft 202.

Figure 5A:
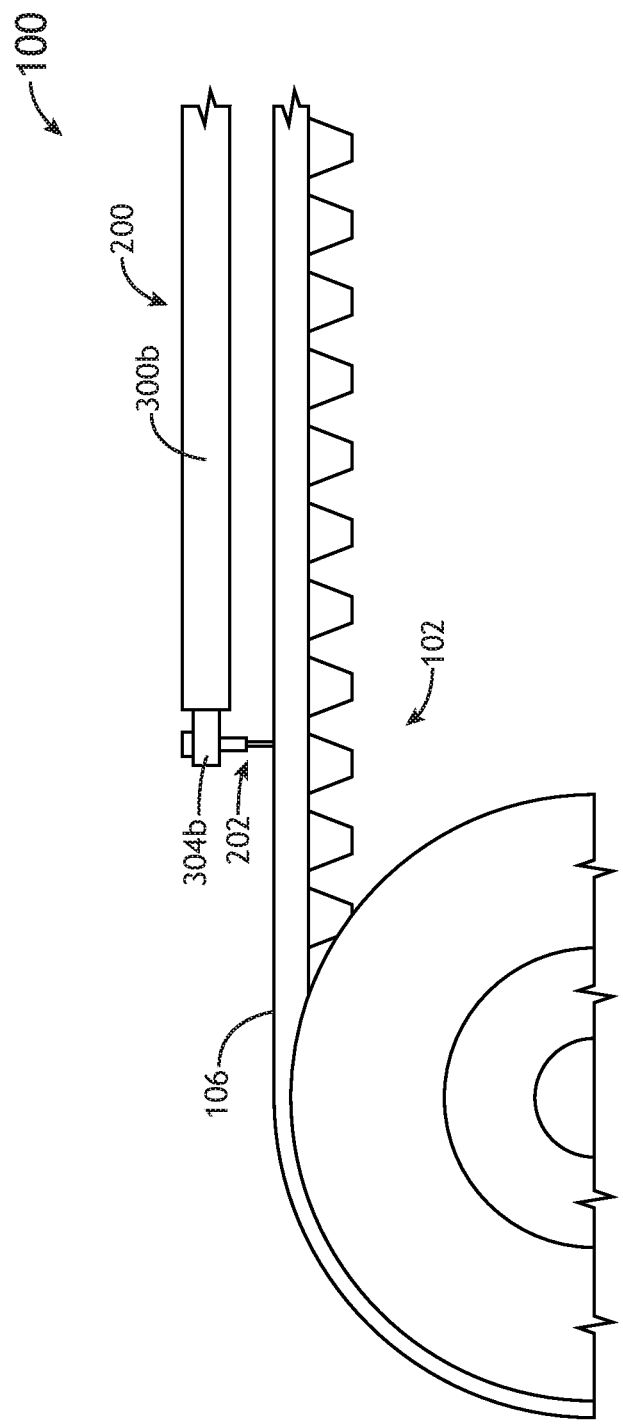
FIG. 5A illustrates a partial view of a system including a belt tension measurement device, in accordance with one or more embodiments of the present disclosure.

Referring now to FIG. 5A, the label 302b may not define a mark when the moveable shaft 202 is in the zero position.

Figure 5B:
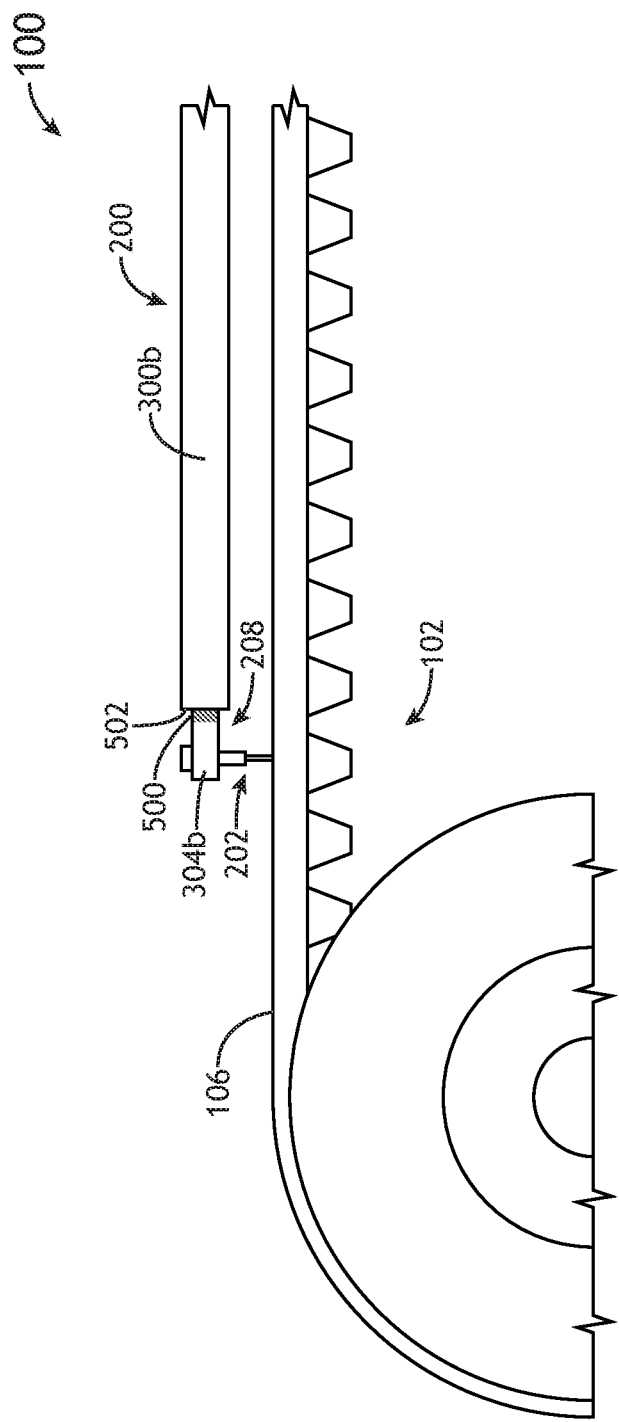
FIG. 5B illustrates a partial view of a system including a belt tension measurement device, in accordance with one or more embodiments of the present disclosure.

Referring now to FIG. 5B, the label 302b may define a first mark 500 (e.g., a line of a first color including, but not limited to, green) for a position of the moveable shaft 202 related to a proper tensioning of a wedge V-belt (e.g., V-belt 102) in a new pulley groove (e.g., a new pulley position), where the new pulley position of the moveable shaft 202 is a first select distance from the zero position of the moveable shaft 202. It is noted herein an edge 502 of the end with the opening 208 for the moveable shaft 202 may be aligned with the first mark 500 when the moveable shaft 202 is in the new pulley position.

Figure 5C:
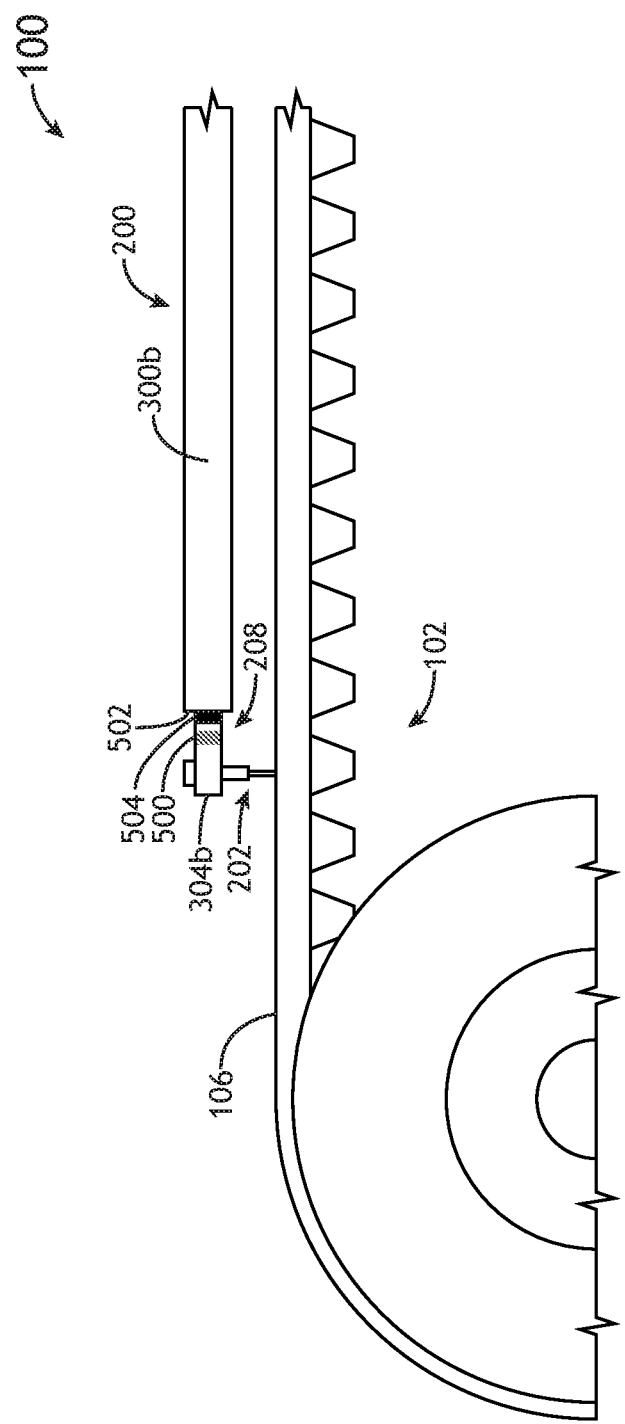
FIG. 5C illustrates a partial view of a system including a belt tension measurement device, in accordance with one or more embodiments of the present disclosure.

Referring now to FIG. 5C, the label 302b may define an additional mark 504 (e.g., a line of an additional color including, but not limited to, blue) for a position of the moveable shaft 202 related to a proper tensioning of a wedge V-belt (e.g., V-belt 102) in a worn pulley groove (e.g., a worn pulley position), where the worn pulley position of the moveable shaft 202 is an additional select distance from the zero position of the moveable shaft 202. It is noted herein the edge 502 of the end with the opening 208 for the moveable shaft 202 may be aligned with the additional mark 504 when the moveable shaft 202 is in the worn pulley position.

It is noted herein the position of the first mark 500 and/or the additional mark 504 on the surface 304b of the moveable shaft 202 may be based on a percentage of stretching of the total V-belt length. For example, the wedge V-belt (e.g., V-belt 102) in the new pulley groove may be at 1% of stretching of the total V-belt length. By way of another example, the wedge V-belt (e.g., V-belt 102) in the worn pulley groove may include an additional 20% of the original 1% stretching, such that the wedge V-belt (e.g., V-belt 102) in the worn pulley groove may be at 1.2% of stretching of the total V-belt length.

In another embodiment, as illustrated in FIG. 3C, a surface 300c (e.g., a top surface) of the belt tension measurement device 100 includes a label 302c corresponding to information about a Kevlar heavy-duty V-belt (e.g., V-belt 102). For example, the label 302c may include information regarding the types of Kevlar V-belts including, but not limited to, Kevlar belt type AK, BK, CK, 3VK, SVK, 8VK, or the like). By way of another example, the label 302c may include information regarding what is indicated by a Kevlar set of marks on a surface 304c of the moveable shaft 202.

Figure 6A:
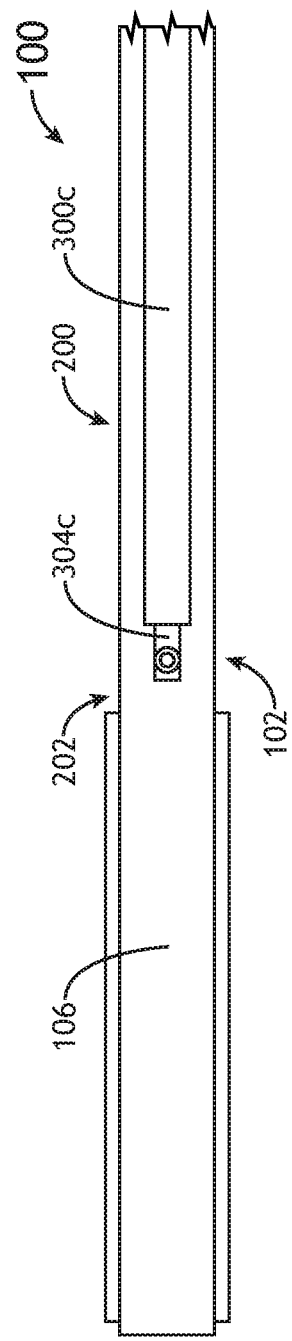
FIG. 6A illustrates a partial view of a system including a belt tension measurement device, in accordance with one or more embodiments of the present disclosure.

Referring now to FIG. 6A, the label 302c may not define a mark when the moveable shaft 202 is in the zero position.

Figure 6B:
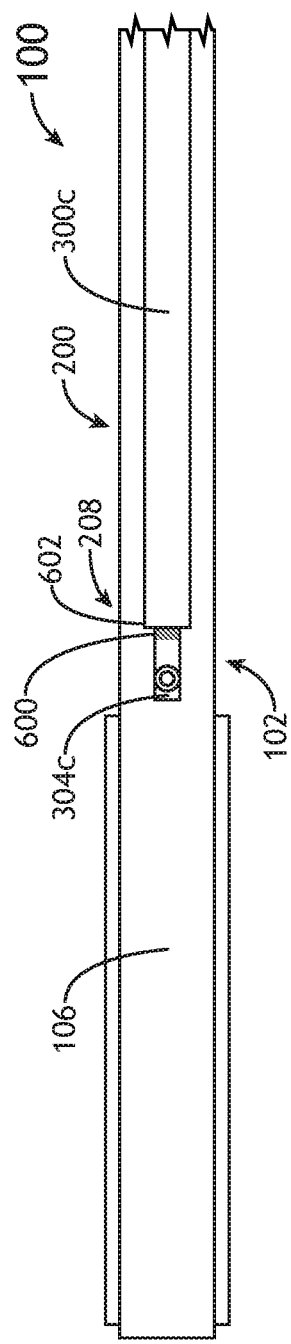
FIG. 6B illustrates a partial view of a system including a belt tension measurement device, in accordance with one or more embodiments of the present disclosure.

Referring now to FIG. 6B, the label 302c may define a first mark 600 (e.g., a line of a first color including, but not limited to, yellow) for a position of the moveable shaft 202 related to a proper tensioning of a Kevlar V-belt (e.g., V-belt 102) in a new pulley groove (e.g., a new pulley position), where the new pulley position of the moveable shaft 202 is a first select distance from the zero position of the moveable shaft 202. It is noted herein an edge 602 of the end with the opening 208 for the moveable shaft 202 may be aligned with the first mark 600 when the moveable shaft 202 is in the new pulley position.

Figure 6C:
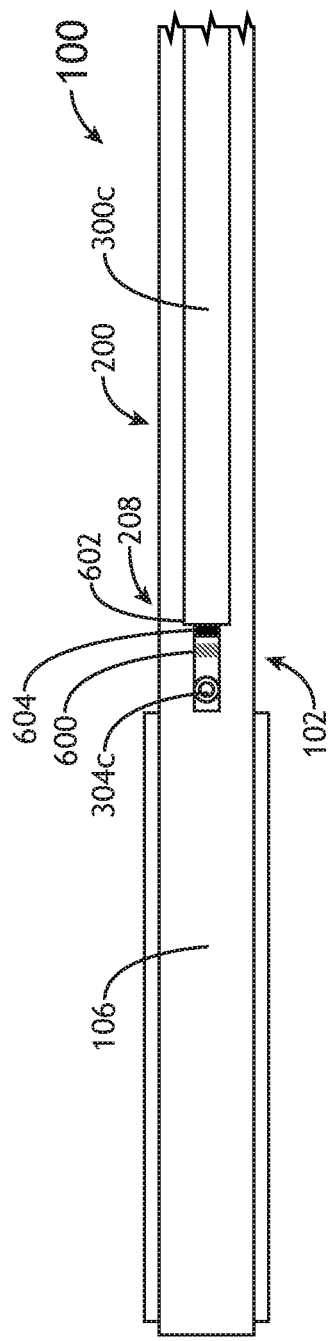
FIG. 6C illustrates a partial view of a system including a belt tension measurement device, in accordance with one or more embodiments of the present disclosure.

Referring now to FIG. 6C, the label 302c may define an additional mark 604 (e.g., a line of an additional color including, but not limited to, black) for a position of the moveable shaft 202 related to a proper tensioning of a Kevlar V-belt (e.g., V-belt 102) in a worn pulley groove (e.g., a worn pulley position), where the worn pulley position of the moveable shaft 202 is an additional select distance from the zero position of the moveable shaft 202. It is noted herein the edge 602 of the end with the opening 208 for the moveable shaft 202 may be aligned with the additional mark 604 when the moveable shaft 202 is in the worn pulley position.

It is noted herein the position of the first mark 600 and/or the additional mark 604 on the surface 304c of the moveable shaft 202 may be based on a percentage of stretching of the total V-belt length. For example, the Kevlar V-belt (e.g., V-belt 102) in the new pulley groove may be at 0.6% of stretching of the total V-belt length. By way of another example, the Kevlar V-belt (e.g., V-belt 102) in the worn pulley groove may include an additional 20% of the original 0.6% stretching, such that the Kevlar V-belt (e.g., V-belt 102) in the worn pulley groove may be at 0.72% of stretching of the total V-belt length.

It is noted herein that the positions of the marks 400, 404, 500, 504, 600, 604 may be considered "tension positions," for purposes of the present disclosure. In addition, it is noted herein the distance between the zero position and the marks 400, 404 as illustrated in FIGS. 4A-4C, the marks 500, 504 as illustrated in FIGS. 5A-5C, and/or the marks 600, 604 as illustrated in FIGS. 6A-6C may be selected to compensate for the need to over-tension the V-belt 102 when first installed within a pulley, as the V-belt 102 will become looser during the initial run as it seats within the set of pulley grooves of set of two or more pulleys 104.

Although embodiments of the present disclosure (e.g., as illustrated in FIGS. 4A, 5A, and 6A) are directed to the moveable shaft 202 not included a mark for the zero position (and thus the labels 302a, 302b, 302c as illustrated in FIGS. 3A-3C not defining a mark), it is noted herein the surfaces 304a, 304b, 304c may include zero position mark, such that and the marks 400, 404, 500, 504, 600, 604 may be spaced from the zero position mark and the labels 302a, 302b, 302c may define the zero position mark. Therefore, the above description should not be interpreted as a limitation on the present disclosure but merely an illustration.

Although embodiments of the present disclosure (e.g., as illustrated in FIGS. 4A-6C) are directed to measuring tension by coupling the belt tension measurement device 100 to the outer surface 106 of the V-belt 102, it is noted herein the belt tension measurement device 100 may similarly measure tension while coupled to the side surface or sidewall 108 of the V-belt 102, or the surface (e.g., inner surface) of the base 110 of the V-belt 102. Therefore, the above description should not be interpreted as a limitation on the present disclosure but merely an illustration.

In one embodiment, one or more of the labels 302a, 302b, 302c are permanently disposed on the surface 300a, 300b, 300c of the sleeve 202, respectively, allowing a user to measure tension with the belt measurement tension device 100 without concern of one or more of the labels 302a, 302b, 302c shifting and/or being altered. For example, one or more of the labels 302a, 302b, 302c may be scored, etched, extruded, formed, casted, molded, stamped, printed, or any other fabrication process or marking process known in the art. For instance, one or more of the labels 302a, 302b, 302c may be generated during the fabrication of the sleeve 200 via one or more fabrication processes, where the one or more fabrication processes are performed by one or more tools including, but not limited to, a scorer, an etcher, an extruder, a roller, one or more dies, a forming apparatus, a casting apparatus, a molding press, a stamp press, or the like. In addition, one or more of the labels 302a, 302b, 302c may be generated following the fabrication of the sleeve 200 from the via one or more marking processes, the one or more marking processes performed by one or more tools including, but not limited to, a video jet printer including an ink jet printing system or a laser jet printing system, a spray paint marking system, a brush paint marking system, or the like.

In another embodiment, the one or more fabrication processes and the one or more marking processes are simultaneous or substantially simultaneous processes. In another embodiment, the one or more marking processes are subsequent processes to the one or more fabrication processes.

Although embodiments of the present disclosure are directed to one or more of the labels 302a, 302b, 302c are permanently disposed on the surface 300a, 300b, 300c of the sleeve 200, respectively, it is noted herein one or more of the labels 302a, 302b, 302c may be temporarily disposed on the surface 300a, 300b, 300c of the sleeve 200, respectively. For example, one or more of the labels 302a, 302b, 302c may include a sticker. By way of another example, one or more of the labels 302a, 302b, 302c may include a marked metal or plastic plate applied via an adhesive, one or more fasteners, one or more tack welds, or the like. Therefore, the above description should not be interpreted as a limitation on the present disclosure but merely an illustration.

In one embodiment, one or more of the marks 400, 404, 500, 504, 600, 604 are permanently disposed on the surface 304a, 304b, 304c of the moveable shaft 202, respectively, allowing a user to measure tension with the belt measurement tension device 100 without concern of one or more of the marks 400, 404, 500, 504, 600, 604 shifting and/or being altered. For example, one or more of the marks 400, 404, 500, 504, 600, 604 may be scored, etched, extruded, formed, casted, molded, stamped, printed, or any other fabrication process or marking process known in the art. For instance, one or more of the marks 400, 404, 500, 504, 600, 604 may be generated during the fabrication of the moveable shaft 202 via one or more fabrication processes, where the one or more fabrication processes are performed by one or more tools including, but not limited to, a scorer, an etcher, an extruder, a roller, one or more dies, a forming apparatus, a casting apparatus, a molding press, a stamp press, or the like. In addition, one or more of the marks 400, 404, 500, 504, 600, 604 may be generated following the fabrication of the moveable shaft 202 from the via one or more marking processes, the one or more marking processes performed by one or more tools including, but not limited to, a video jet printer including an ink jet printing system or a laser jet printing system, a spray paint marking system, a brush paint marking system, or the like.

In another embodiment, the one or more fabrication processes and the one or more marking processes are simultaneous or substantially simultaneous processes. In another embodiment, the one or more marking processes are subsequent processes to the one or more fabrication processes.

Although embodiments of the present disclosure are directed to one or more of the marks 400, 404, 500, 504, 600, 604 are permanently disposed on the surface 304a, 304b, 304c of the moveable shaft 202, respectively, it is noted herein one or more of the marks 400, 404, 500, 504, 600, 604 may be temporarily disposed on the surface 304a, 304b, 304c of the moveable shaft 202, respectively. For example, one or more of the marks 400, 404, 500, 504, 600, 604 may include a sticker. By way of another example, one or more of the marks 400, 404, 500, 504, 600, 604 may include a marked metal or plastic plate applied via an adhesive, one or more fasteners, one or more tack welds, or the like. Therefore, the above description should not be interpreted as a limitation on the present disclosure but merely an illustration.

Figure 7:
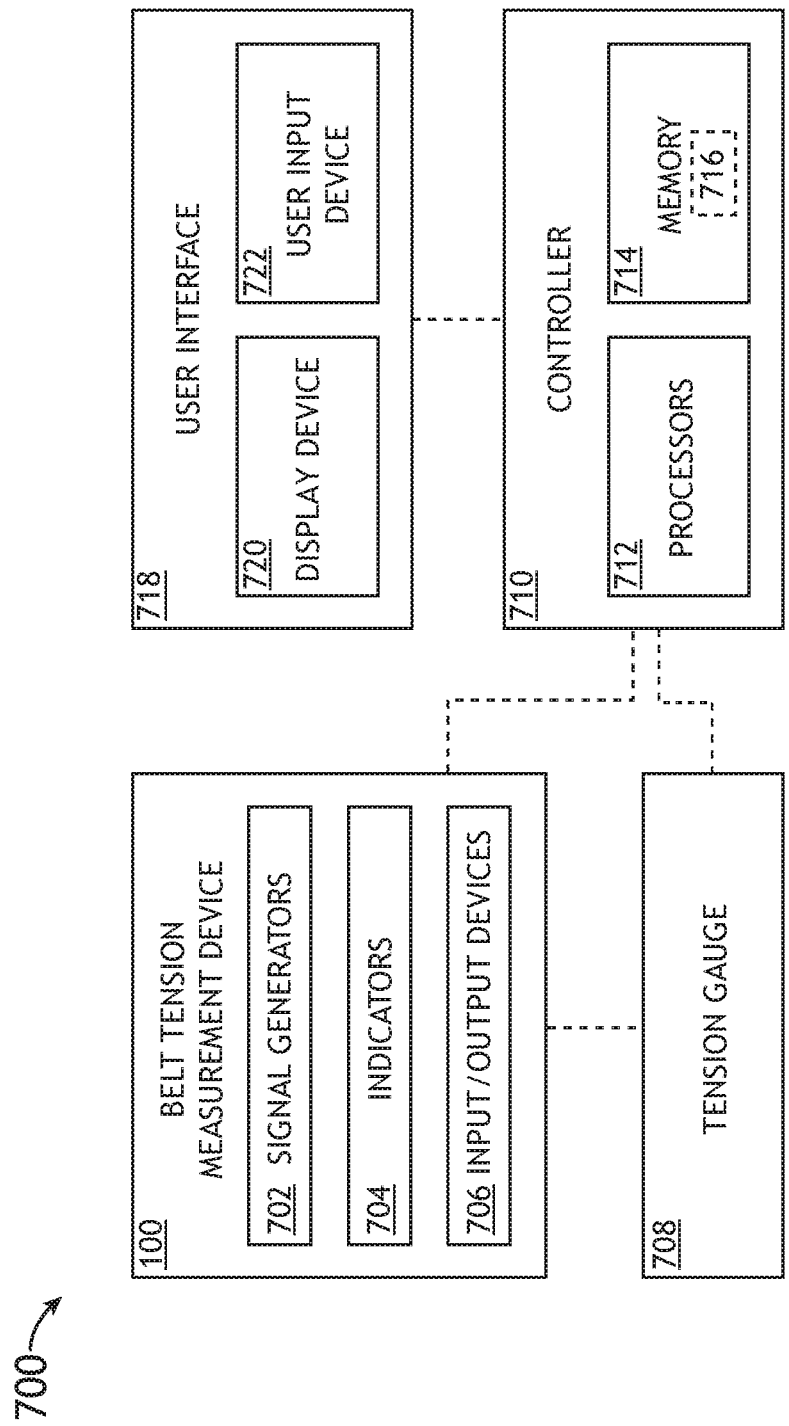
FIG. 7 illustrates a block diagram of a system including a belt tension measurement device, in accordance with one or more embodiments of the present disclosure.

FIG. 7 illustrates a system 700 including the belt tension measurement device 100, in accordance with one or more embodiments of the present disclosure.

In one embodiment, the belt tension measurement device 100 includes one or more signal generators 702 between the sleeve 200 and the moveable shaft 202. For example, the one or more signal generators 702 may include, but are not limited to, one or more sensors. For instance, the one or more sensors may be any type of sensor known in the art including, but are not limited to, one or more potentiometers, one or more strain gauges, or the like. By way of another example, the moveable shaft 202 may include an electrical contact point configured to engage one or more additional electrical contact points on the sleeve 200. For instance, the sleeve 200 may include a first electrical contact point for a first mark and an additional electrical contact point for an additional mark.

In another embodiment, the belt tension measurement device 100 includes one or more electronic (e.g., digital) indicators 704 that are activated and/or deactivated based on one or more outputted signals from the one or more signal generators 702. For example, the one or more electronic indicators 704 may include, but are not limited to, one or more visual indicators (e.g., one or more lights), one or more graphical indicators displayed on a screen, one or more auditory indicators (e.g., one or more sounds emitted from a speaker), or the like. It is noted herein the one or more electronic indicators 704 may be utilized in addition to or instead of the one or more analog indicators (e.g., the marks 400, 404, 500, 504, 600, 604).

In another embodiment, the belt tension measurement device 100 may include one or more input/output devices 706 (e.g., ports, couplers, or the like). For example, the one or more input/output devices 706 may include, but are not limited to, one or more data ports, one or more power ports, one or more ground ports, or the like.

In another embodiment, the belt tension measurement device 100 is communicatively coupled to an electronic tension gauge 708 via the one or more input/output devices 706. In another embodiment, the electronic tension gauge 708 is communicatively coupled to one or more controllers 710 via the one or more input/output devices 706.

It is noted herein, however, that the one or more controllers 710 may be communicatively coupled to the one or more input-output devices 706 and may perform one or more of the functions of the electronic tension gauge 708. In this regard, the electronic tension gauge 708 may not be an integral or required component of the system 700.

In another embodiment, the one or more controllers 710 includes one or more processors 712 and memory 714. In another embodiment, one or more sets of program instructions 716 are stored within the memory 714 and configured to be executable by the processors 712.

In another embodiment, the one or more controllers 710 may be communicatively coupled to and/or include a user interface 718. For example, the user interface 718 may include a display device 720 and/or a user input device 722. For instance, the user interface 718 may include any component configurable to provide or produce one or more visual indicators (e.g., one or more lights), one or more graphical indicators (e.g., displayed on the display device 720), one or more auditory indicators (e.g., one or more sounds emitted from a speaker), or the like.

In another embodiment, the one or more controllers 710 are communicatively coupled to and/or include one or more electronic indicators. For example, the one or more electronic indicators may be utilized in addition to or instead of the one or more analog indicators (e.g., the marks 400, 404, 500, 504, 600,604) and/or the one or more electronic indicators 704.

It is noted herein the system 700 may be configured such that the one or more controllers 710 may be provided with the belt tension measurement device 100, or be a separate component couplable to the belt tension measurement device 100.

In one example, the one or more controllers 710 may receive a belt type selection (e.g., via the user input device 722). The one or more controllers 710 may then receive one or more belt tension measurements (e.g., via the one or more input/output devices 706 and/or via the electronic tension gauge 708 coupled to the one or more input/output device 706). The one or more controllers 710 may provide an indication (e.g., on the display device 720 of the user interface 718) after determining the belt tension measurement device 100 is properly tensioned (e.g., at the new pulley position of the moveable shaft 202 and/or the worn pulley position of the moveable shaft 202). For example, the received one or more belt tension measurements may be compared to a set of proper tensioning data for the selected V-belt type. For instance, the set of proper tensioning data may be stored within the memory 714 and/or input via the user input device 722.

Advantages of the present disclosure include a belt tension measurement device. Advantages of the present disclosure also include one or more sets of markings on the belt tension measurement device, where the one or more sets of markings correspond to a particular V-belt type, where the one or more markings are configured to indicate when the particular V-belt type is correctly tensioned.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to,"

"conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A belt tension measurement device, comprising:
a sleeve including an opening in at least one end;
a shaft insertable into the opening, wherein at least a portion of the shaft protrudes from the opening when in a zero position;
an elastic component configured to provide a return force to the shaft; and
a first securing component configured to couple the sleeve to a surface of a power transmission belt and an additional securing component configured to couple the shaft to the surface of the power transmission belt,
wherein the shaft includes one or more sets of marks, wherein a set of the one or more sets of marks includes at least one mark, wherein the at least one mark corresponds to at least one shaft position where the power transmission belt is tensioned a pre-determined amount via an extension force generated by an elongation of the power transmission belt, wherein the shaft is moveable between the at least one shaft position and the zero position via the return force provided via the elastic component.

2. The device in claim 1, wherein the power transmission belt includes a V-belt.

3. The device in claim 2, wherein the one or more sets of marks includes a set of marks for at least one of a classical V-belt, a wedge V-belt, or a Kevlar V-belt.

4. The device in claim 2, wherein the one or more sets of marks includes a first set of marks and at least an additional set of marks for at least two of a classical V-belt, a wedge V-belt, or a Kevlar V-belt.

5. The device in claim 2, wherein the one or more sets of marks includes a first set of marks for a classical V-belt, a second set of marks for a wedge V-belt, and a third set of marks for a Kevlar V-belt.

6. The device in claim 1, wherein the at least one mark includes a first mark corresponding to a first shaft position where the power transmission belt is tensioned a first pre-determined amount, wherein the first position is separated from the zero position by a first distance.

7. The device in claim 6, wherein the at least one mark includes an additional mark corresponding to an additional shaft position where the power transmission belt is tensioned an additional pre-determined amount, wherein the additional position is separated from the zero position by an additional distance.

8. The device in claim 7, wherein the distance between a worn pulley position mark and the zero position is greater than the distance between the distance between a new pulley position mark and the zero position.

9. The device in claim 1, wherein the first securing component includes a sleeve pin configured to pass through one or more of a top surface or a bottom surface of the sleeve, wherein the sleeve pin is configured to couple the sleeve to the surface of the power transmission belt.

10. The device in claim 9, wherein the additional securing component includes a shaft pin configured to pass through one or more of a top surface and a bottom surface of the shaft, wherein the shaft pin is configured to couple the shaft to the surface of the power transmission belt.

11. The device in claim 10, wherein the shaft pin is configured to prevent the portion of the shaft from retracting into the opening past the zero position.

12. The device in claim 10, wherein the surface of the power transmission belt includes an outer surface of the power transmission belt, a sidewall of the power transmission belt, or a surface of a base of the power transmission belt.

13. The device in claim 1, wherein the elastic component includes at least one of an elastic cord or a spring.

14. The device in claim 1, wherein the elastic component is coupled to at least one of the sleeve pin, the shaft pin, or a fastener.

15. A belt tension measurement device, comprising:
a sleeve including an opening in at least one end;
a shaft insertable into the opening, wherein at least a portion of the shaft protrudes from the opening when in a zero position;
an elastic component configured to provide a return force to the shaft;
a first securing component configured to couple the sleeve to a surface of a power transmission belt and an additional securing component configured to couple the shaft to the surface of the power transmission belt;
one or more signal generators configured to output one or more signals corresponding to at least one shaft position where the power transmission belt is tensioned a pre-determined amount via an extension force generated by an elongation of the power transmission belt, wherein the shaft is moveable between the at least one shaft position and the zero position via the return force provided via the elastic component; and
one or more electronic indicators configured to at least one of activate or deactivate based on the one or more signals outputted by the one or more signal generators.

16. A belt tension measurement device, comprising:
a sleeve including an opening in at least one end;
a shaft insertable into the opening, wherein at least a portion of the shaft protrudes from the opening when in a zero position;
an elastic component configured to provide a return force to the shaft;
a first securing component configured to couple the sleeve to a surface of a power transmission belt and an additional securing component configured to couple the shaft to the surface of the power transmission belt;
one or more signal generators configured to output one or more signals corresponding to at least one shaft position where the power transmission belt is tensioned a pre-determined amount via an extension force generated by an elongation of the power transmission belt, wherein the shaft is moveable between the at least one shaft position and the zero position via the return force provided via the elastic component; and
one or more input/output devices configured to transmit the one or more outputted signals.

17. The device in claim 16, wherein the one or more input/output devices are communicatively couplable to at least one controller, wherein the at least one controller includes one or more processors and memory configured to store one or more sets of program instructions, wherein the one or more processors are configured to execute the one or more sets of program instructions, wherein the one or more sets of program instructions are configured to cause the one or more processors to:
receive the one or more outputted signals via the one or more input/output devices of the belt tension measurement device;
determine a tension of the power transmission belt from the one or more measurements; and
provide one or more indicators when the tension of the power transmission belt reaches the pre-determined amount.

18. The device in claim 17, wherein the at least one controller is communicatively couplable to a user interface comprising a display device and a user input device, wherein the one or more sets of program instructions are further configured to cause the one or more processors to:
receive one or more user inputs via the user input device prior to receiving the one or more measurements from the belt tension measurement device; and
provide the one or more indicators on the display when the tension of the power transmission belt reaches the pre-determined amount.

19. The device in claim 17, wherein the one or more input/output devices are communicatively couplable to an electronic tension gauge, wherein the electronic tension gauge is communicatively couplable to the at least one controller, wherein the electronic tension gauge is configured to:
receive the one or more outputted signals from the one or more input/output devices of the belt tension measurement device; and
transmit the one or more measurements to the at least one controller.

20. A belt tension measurement device, comprising:
a sleeve including an opening in at least one end;
a shaft insertable into the opening, wherein at least a portion of the shaft protrudes from the opening when in a zero position; and
a first securing component configured to couple the sleeve to a surface of a power transmission belt and an additional securing component configured to couple the shaft to the surface of the power transmission belt, wherein the power transmission belt includes at least one of a classical V-belt, a wedge V-belt, or a Kevlar V-belt,
wherein the shaft includes one or more sets of marks, wherein the one or more sets of marks includes a set of marks for at least one of a classical V-belt, a wedge V-belt, or a Kevlar V-belt, wherein a set of the one or more sets of marks includes at least one mark, wherein the at least one mark corresponds to at least one shaft position where the power transmission belt is tensioned a pre-determined amount via an extension force generated by an elongation of the power transmission belt, wherein the shaft is moveable between the zero position and the at least one shaft position.

21. The device in claim 20, wherein the one or more sets of marks includes the first set of marks and at least an additional set of marks for at least two of a classical V-belt, a wedge V-belt, or a Kevlar V-belt.

22. The device in claim 20, wherein the one or more sets of marks includes the first set of marks for a classical V-belt, a second set of marks for a wedge V-belt, and a third set of marks for a Kevlar V-belt.

23. A belt tension measurement device, comprising:

a sleeve including an opening in at least one end;

a shaft insertable into the opening, wherein at least a portion of the shaft protrudes from the opening when in a zero position, wherein the shaft includes one or more sets of marks, wherein the one or more sets of marks includes a set of marks for at least one of a classical V-belt, a wedge V-belt, or a Kevlar V-belt;

a first securing component configured to couple the sleeve to a surface of a power transmission belt and an additional securing component configured to couple the shaft to the surface of the power transmission belt, wherein the power transmission belt includes at least one of a classical V-belt, a wedge V-belt, or a Kevlar V-belt;

one or more signal generators configured to output one or more signals corresponding to at least one shaft position where the power transmission belt is tensioned a pre-determined amount via an extension force generated by an elongation of the power transmission belt, wherein the shaft is moveable between the zero position and the at least one shaft position; and one or more electronic indicators configured to at least one of activate or deactivate based on the one or more signals outputted by the one or more signal generators.

24. A belt tension measurement device, comprising:

a sleeve including an opening in at least one end;

a shaft insertable into the opening, wherein at least a portion of the shaft protrudes from the opening when in a zero position, wherein the shaft includes one or more sets of marks, wherein the one or more sets of marks includes a set of marks for at least one of a classical V-belt, a wedge V-belt, or a Kevlar V-belt;

a first securing component configured to couple the sleeve to a surface of a power transmission belt and an additional securing component configured to couple the shaft to the surface of the power transmission belt, wherein the power transmission belt includes at least one of a classical V-belt, a wedge V-belt, or a Kevlar V-belt;

one or more signal generators configured to output one or more signals corresponding to at least one shaft position where the power transmission belt is tensioned a pre-determined amount via an extension force generated by an elongation of the power transmission belt, wherein the shaft is moveable between the zero position and the at least one shaft position; and one or more input/output devices configured to transmit the one or more outputted signals.

* * * * *